Patented May 31, 1949

2,471,896

UNITED STATES PATENT OFFICE 2,471,896 pH INDICATOR

James W. Ransom, Lansdowne, Pa.

No Drawing. Application July 31, 1946,
Serial No. 687,525

7 Claims. (Cl. 23—230)

This invention relates to the determination of pH value or hydrogen ion concentration by the colorimetric method. The invention is particularly concerned with a new type of pH indicator having improved indicating characteristics.

The determination of pH value or hydrogen ion concentration of aqueous solutions by the colorimetric method is well known and numerous indicators have been suggested for this purpose. The utility of the usual pH indicator generally is limited to a relatively narrow pH range. This is shown by the "Table of indicators" appearing in the "Handbook of Chemistry and Physics," 29th edition, pages 1363–1366, wherein there are listed many of the known indicators together with the corresponding pH range or ranges at which color changes take place. From this table it may be observed that a given pH indicator generally will undergo only one or two color changes. In order to indicate pH value throughout a wide range, it has been heretofore necessary to employ a plurality of indicators properly selected to give color changes at desired intervals throughout the full range.

The present invention provides an improved pH indicator having the ability to undergo a number of characteristic color changes at intervals throughout a wide pH range. The invention therefore provides a single indicator which may be employed to determine pH values over an unusually wide pH range.

The indicator according to the invention comprises the cooked juice of the fruit obtained from the Guineense variety of the *Solanum Nigrum* species of plant belonging to the *Solanum* or nightshade genus, otherwise variously known as garden-huckleberry, sunberry, stubbleberry or wonderberry. This plant (hereinafter referred to as garden huckleberry) is an annual half-hardy herb. It forms clusters of tulip-shaped flowers which, after pollination, develop into fruit of one-half to three-quarter inch diameter having a deep purple color, each having of the order of thirty seeds.

The indicator is prepared from the fruit by extracting the juice and cooking the same or by first cooking the fruit and subsequently extracting the juice. It is best to carry out the cooking operation in a closed vessel to minimize contact of the juice with the air. However, the cooking may be done in an open vessel if desired but in such case the cooking should be discontinued before the juice begins to turn from purple to brown. Such change in color is an indication that the cooking operation has been conducted for too long a time. The proper length of time will vary dependent upon the pressure under which the cooking is effected. It has been found that a ten minute cooking period under a pressure of 15 lbs./sq. in. gauge is satisfactory. A longer time may be required if the cooking is done at atmospheric pressure.

The cooked product should be kept in hermetically sealed, sterile containers until it is to be used. Preservatives such as alcohol, acetone, sodium benzoate or the like may be added, if desired, to help preserve the product and a buffer may be added to regulate the pH value. The natural pH value of the cooked juice has been found to be about 5.

The indicator prepared in the above described manner is characterized by its ability to undergo a relatively large number of distinct color changes at definite pH values throughout a wide pH range. Specifically, the color changes obtained and the corresponding pH values are as follows:

| Color | pH Value |
|---|---|
| Dark red | [1] 2.7 |
| Light red | 3.4 |
| Purple magenta | 4.0 |
| Purple | 5.0 |
| Blue | 6.0 |
| Blue green | 7.6 |
| Green | 9.7 |
| Yellow green | 10.7 |

[1] And below.

At pH values above 10.7, the indicator imparts a yellow color to the solution.

Only a relatively minute amount of the indicator need be added to the solution to be tested in order to obtain color changes readily perceivable. For example, one to two drops of the indicator for each 10 ml. of solution generally is sufficient. The indicator is reasonably stable in the presence of strong acid or strong alkali, although there is some tendency for the indicator to be destroyed in time particularly where the solution is highly alkaline.

The uncooked juice of the aforesaid fruit also is capable of functioning as a pH indicator. Its utility, however, is confined to a more limited pH range (3–8) wherein only three different colors (red, purple and green) are encountered. It therefore appears that the cooking operation produces chemical changes resulting in a new composition having the unusual pH indicating characteristics shown above.

I have also found that pH indicators may be obtained from other fruits and flowers. For example, I have prepared pH indicators from ordinary huckleberries, hollyhock flowers, rose petals, black sweet cherries, fruit of the flowering cherry and red geranium flowers. These and other similar fruits and flowers will yield pH indicators capable of undergoing a plurality of color changes at various pH values. However, none of these has the outstanding characteristics of the herein described indicator derived from the garden-huckleberry fruit.

Having described my invention, what I claim and desire to protect by Letters Patent is:

1. Process which comprises adding a relatively minute amount of the cooked juice of the garden-huckleberry to an aqueous solution and evaluating the pH of the solution in terms of the color thereof.

2. Process which comprises adding a relatively minute amount of the cooked juice of the garden-huckleberry to an aqueous solution and determining the pH of the solution by observing the color thereof.

3. Process which comprises adding a relatively minute amount of the cooked juice of the garden-huckleberry to an aqueous solution and determining the pH of the solution by evaluating the color thereof relative to a predetermined standard.

4. Process which comprises adding a relatively minute amount of the cooked juice of the garden-huckleberry to an aqueous solution and determining the pH of the solution by comparing the color thereof with an object of known color.

5. Process which comprises adding a relatively minute amount of the cooked juice of the garden-huckleberry to an aqueous solution and determining the pH of the solution by comparing the color thereof with a scale of color values.

6. Process which comprises adding a relatively minute amount of the cooked juice of the garden-huckleberry to an aqueous solution and determining the pH of the solution by comparing the color thereof with a scale of colors correlated with a scale of pH values.

7. Process which comprises adding a relatively minute amount of a mixture of organic compounds contained in the cooked fruit juice of the garden-huckleberry plant to an aqueous solution and evaluating the pH of the solution in terms of the color thereof.

JAMES W. RANSOM.

REFERENCES CITED

The following references are of record in the file of this patent:

Bailey, "The Standard Cyclopedia of Horticulture," The Macmillan Co., 1943, vol. III, page 3182.

Hackhs, "Chemical Dictionary," 3rd. ed., The Blackiston Co., Philadelphia, 1944, page 437.